US006859220B2

(12) United States Patent
Suzuki et al.

(10) Patent No.: US 6,859,220 B2
(45) Date of Patent: Feb. 22, 2005

(54) PROCESS AND APPARATUS FOR FORMING IMAGES

(75) Inventors: Kenji Suzuki, Kawasaki (JP); Toru Nagata, Tokyo (JP); Yoshinari Yasui, Chigasaki (JP); Hiroshi Ochiai, Koza-gun (JP); Hiroshi Miyamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/639,589

(22) Filed: Aug. 13, 2003

(65) Prior Publication Data

US 2004/0027435 A1 Feb. 12, 2004

Related U.S. Application Data

(62) Division of application No. 09/383,639, filed on Aug. 26, 1999, now Pat. No. 6,650,350.

(30) Foreign Application Priority Data

Aug. 31, 1998 (JP) .......................................... 10-245993

(51) Int. Cl.[7] ............................................... G01D 15/10
(52) U.S. Cl. ...................................................... 347/212
(58) Field of Search ................................ 347/101, 102, 347/103, 105, 106, 202, 204, 212, 213; 503/227

(56) References Cited

U.S. PATENT DOCUMENTS

| | | | |
|---|---|---|---|
| 4,446,467 | A | 5/1984 | Takiguchi et al. |
| 4,756,963 | A | 7/1988 | Yamamoto et al. |
| 4,868,581 | A | 9/1989 | Mouri et al. |
| 4,978,560 | A | 12/1990 | Stone |
| 5,387,573 | A | 2/1995 | Oldfield et al. |
| 5,677,062 | A | 10/1997 | Kuroda et al. |
| 5,682,194 | A | 10/1997 | Uyttendaele et al. |
| 5,751,432 | A | 5/1998 | Gwaltney |
| 6,097,922 | A | 8/2000 | Munenaka |
| 6,184,181 | B1 | 2/2001 | Lum et al. |
| 6,234,606 | B1 | 5/2001 | Suzuki |

FOREIGN PATENT DOCUMENTS

| | | |
|---|---|---|
| JP | 5-232841 | 9/1993 |

*Primary Examiner*—Ren L Yan
(74) *Attorney, Agent, or Firm*—Fitzpatrick, Cella, Harper & Scinto

(57) ABSTRACT

An image forming process for forming a protective layer of thermoplastic resin particles on a recording medium comprising the steps of conducting recording on a recording medium with an image-receiving layer, providing a thermoplastic resin particles onto the image-receiving layer and heating and pressurizing the thermoplastic resin particles on the image-receiving layer, and an image forming apparatus comprising an ink-jet head for conducting recording on a recording medium, a providing means for providing thermoplastic particles to a recorded recording medium, and heating and pressurizing means for heating and pressurizing the thermoplastic particles to flatten.

7 Claims, 3 Drawing Sheets

PROCESS AND APPARATUS FOR FORMING IMAGES

This application is a division of Application No. 09/383,639 filed Aug. 26, 1999, now U.S. Pat. No. 6,650,350 B2 issued Nov. 18, 2003.

BACKGROUND OF THE INVENTION

1. Field of the Invention

The invention relates to a method for forming images comprising providing a protective layer formed of thermoplastic resin particles over images formed on a recording medium and an apparatus for carrying out the method for forming images.

2. Related Background Art

In recent years, the progress of the ink-jet recording technique is noteworthy and its image quality has reached a level equal or superior to that of a silver halide print. As to recording media used for this ink-jet recording process, those with an image-receiving layer, containing porous particles excellent in absorbing and fixing recording liquid, provided on a base material such as paper are known.

Also known is a laminating treatment of a recorded image by transferring and laminating a transfer layer comprising a thermofusing resin layer provided on a base material onto a recorded image by heat and pressure adhesion to give waterproof, light resistance, glossiness, etc. By having a UV absorbing agent contained in the transfer layer during this treatment, it is also possible to provide a sufficient light resistance to a print. Furthermore, by devising the material and constitution of this transfer layer, many laminating treatments of an image for simply and easily providing the wear resistance, solvent resistance, or the like by use of a resin have been worked out thus far.

FIGS. 6A to 6C are schematic sectional views of a conventional laminating method. The film with a base material shown in FIG. 6A basically comprises a transfer layer 1 to be transferred and laminated onto the surface of a recorded image and a base material film 2 for bearing the transfer layer 1. The transfer layer 1 can be peeled off from the base material 2 so as to be transferred and laminated to the image-receiving layer of a recording medium after recording.

As shown in FIG. 6B, the transfer layer 1 is laminated while remaining borne on the base material film 2 so as to directly cover the top of the image-receiving layer 3*a* on an ink-jet image-receiving paper 3 after recording and applied onto the image-receiving layer 3*a* by pressurization and/or fusion.

As shown in FIG. 6C, the base material layer 2 is peeled off from the transfer layer 1 after the transfer layer is applied onto the recorded image, and the transfer layer 1 alone is left as a protective layer on the image receiving layer 3*a*.

The principal problem of the construction comprising a transfer layer 1 and a base material film 2, as shown in FIGS. 6A, 6B and 6C, is the high cost. In a laminating treatment as mentioned above, a base material film comprising a heat resistant material is necessary for the base material film 2 on which a resin layer to be transferred by heat and pressure adhesion on the recorded side is formed. In this film, not only heat resistance but flatness sufficient for giving the glossiness of a protective film after the transfer is also required, thus resulting in high cost. The cost of this base material film 2 has a much greater weight than that of a transfer material remaining as the final product or that of coating of a transfer layer. Sufficiently stable and deformation-free raw materials of a protective layer under conditions assumed for the thermal transfer include PET film, polyamide film, polyimide film and so on with thermal shrinkage controlled by preannealing, but any of them is a high-cost material. With such a constitution, a wide variety of applications truly low in cost and highly general in purposiveness are difficult to create.

The second problem of this constitution lies in that the base material film 2 becomes a used waste. From the viewpoint of processing cost, coating of a transfer layer 1 is ordinarily executed on a wide roll before slitting. Thus, recycling of used base material films 2 cannot be directly performed. Supposing that used basic films 2 are recycled, they would be done on the level of raw materials. Thus, it costs labor to collect and recycle them. Besides, a mechanism for rewinding a film after the image transfer in an apparatus, a space for disposing the mechanism, a power source for moving the mechanism or control system and so on are necessary. In a case where a laminate material has been cut, winding is unnecessary, but a mechanism for carrying used basic films 2 and accumulating them in a predetermined space is still necessary.

The third problem of this constitution lies in that the function of a protective layer transferred and formed varies with physical property, surface property, thickness or the like of base material films 2. This especially affects the glossiness, the adhesion of a film and the bubble releasability to a great extent. Originally, the transfer process of a glossy protective layer is a complicated process in which many parameters are involved, so that addition of such an influential variable factor is unfavorable to the stability of phenomena.

On the other hand, in Japanese Patent Application Laid-open No. 5-232841, a way to prepare a glossy sheet by using a transparent toner is described. Furthermore, in this specification, a way to make a record after preparing the glossy sheet by using the transparent toner is described. Since a record is made on the transparent toner, compatibility between the transparent toner and the ink must be considered.

SUMMARY OF THE INVENTION

It is one object of the present invention to provide an image forming process and an image forming apparatus capable of solving the problems mentioned above and forming an image good in glossiness at low cost and free of used wastes.

A process for forming images according to the present invention includes the steps of conducting recording on a recording medium provided with an image-receiving layer, providing thermoplastic resin particles onto the image-receiving layer, and heating and pressurizing the thermoplastic resin particles on the image-receiving layer.

Besides, an apparatus for forming images includes an ink-jet head for conducting recording on a recording medium, providing means for providing thermoplastic particles to the recording medium on which recording has been conducted, and heating and pressurizing means for heating and pressurizing the thermoplastic particles to flatten.

DETAILED DESCRIPTION OF THE PREFERRED EMBODIMENTS

Figure 1:
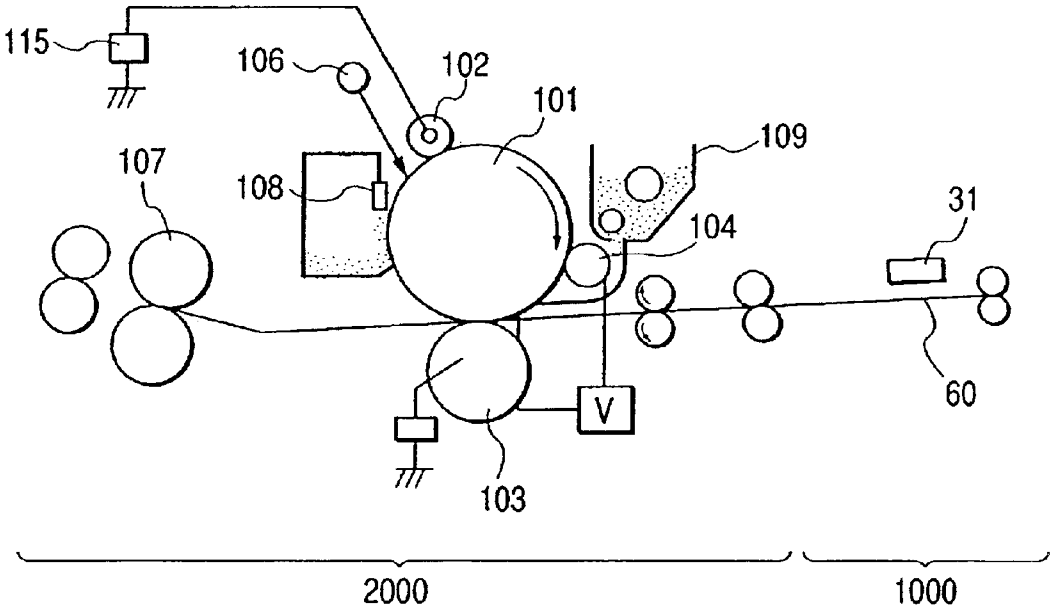
FIG. 1 is an illustration of one example of an image forming apparatus according to the present invention.

On example of an apparatus for forming images according to the present invention as shown in FIG. 1 includes an ink-jet recording section 1000; and a protective layer forming section 2000.

First, in an ink-jet recording section 1000, recording is conducted on the image-receiving layer of a recording medium 60 by means of an ink-jet head 31. Then, in the protective layer forming section 2000, a predetermined voltage is applied to a charging roller 102 from a power supply 115, thereby charging a charged drum 101 (intermediate transfer body) comprising an OPC sensitized body. Furthermore, from a tank 109 for storing thermoplastic resin particles, the thermoplastic resin particles are supplied uniformly onto the surface of the charged drum 101 through a nonmagnetic sleeve 104 and borne thereon. And, by passing the recording medium 60 after the completion of recording between this charged drum 101 and the roller 103, the thermoplastic resin particles are transferred and uniformly applied onto the image-receiving layer of the recording medium 60. At this time, if desired, a bias is applied by bias applying means.

Furthermore, the recording medium 60 is conveyed to a heating and pressurizing roller 107 as fixing means, and a protective layer is formed on the recorded image-receiving layer by heating and pressurizing the thermoplastic resin particles into the shape of a film. Besides, the moisture is eliminated by this thermal fixation, thereby obtaining an anti-migration effect.

Here, to smooth the surface of the protective layer and improve the glossiness of images, a smooth surface on the side in contact with the thermoplastic resin particles is essential for the heating and pressurizing roller 107 as fixing means. To be specific, the surface roughness is preferably in the range of 3 $\mu$m or less in terms of Ra and much preferably in the range of 1.5 $\mu$m or less.

In the present invention, because of directly determining the glossiness of the transfer protective layer (accordingly, of recorded images), the surface glossiness of rollers is an important factor. This glossiness depends on that of images required, but generally is preferably equal to or greater than 10% at an incident angle of 20° and is equal to or greater than 70% at an incident angle of 75°. In addition, when images with a slightly matted surface are necessary, the surface of a roller may be made into such a slightly matted one.

Besides, the heating temperature herein may be selected appropriately corresponding to the material of thermoplastic resin particles and is preferably in the range of 60 to 220° C. normally.

And further, if thermoplastic resin particles remain on the charged drum 101 after the transfer step, they are removed by means of a cleaner 108. Thereafter, the charged drum 101 is discharged by means of a discharger 106, and a charging step using the charger 102 is repeated. In the present invention, these processes of removing the remaining particles and of discharging are not always required, and thus proceeding to the next step is allowable with particles and charge kept unremoved. Since remaining particles and remaining charge frequently cause an uneven thickness or other defects of the protective layer and often lead to deterioration of the final finishing, however, execution of these removing processes is advisable.

In the example mentioned above, a charged drum 101 having photoconductivity was employed as it was, but the charged drum 101 does not always need to be photoconductive in the present invention unlike a conventional electrophotographic apparatus. Thus, various conductive materials which have been known can be widely used for the material of a charged drum 101.

Besides, since the surface of a recording sheet just after the injection of ink contains absorbed moisture, the surface of this charged drum 101 with resin particles transferred thereto may receive the absorbed moisture, thereby resulting in lowered chargeability. Thus, it is desirable to remove the moisture from the drum surface by wiping or blowing (a heated air) after the transfer. Besides, a charged drum 101 as intermediate transfer body is effective also for inhibiting the intrusion of moisture into the storing portion for resin particles.

Furthermore, in the example mentioned above, the charged drum 101 plays a part of preliminary heating means also; however, the present invention is not limited to this embodiment but allows an IR heater, a halogen heater or the like to be provided separately as preliminary heating means. On performing heating to 80° C. or lower by preliminary heating means and to 120° C. or so at the fixation section, for example, a good result will be obtained. In other words, the provision of preliminary heating means removes moisture of the image-receiving layer and effectively prevents slowing down in temperature rise on account of the latent heat of moisture; thus heating can be easily conducted at the heating and pressurizing section (fixing section).

Besides, the heating and pressurizing roller 107 as heat fixing means in FIG. 1 is preferably that having at least the surface made of a releasable material such as silicone rubber and fluorine resin. And, a heating and pressurizing roller having the surface of a metal base coated with a releasable heat resistant resin may also be usable. With a metal roller, the glossiness of a recorded image is still more improved because a higher pressure can be applied, but nevertheless flaws are likely to be generated.

Figure 2:
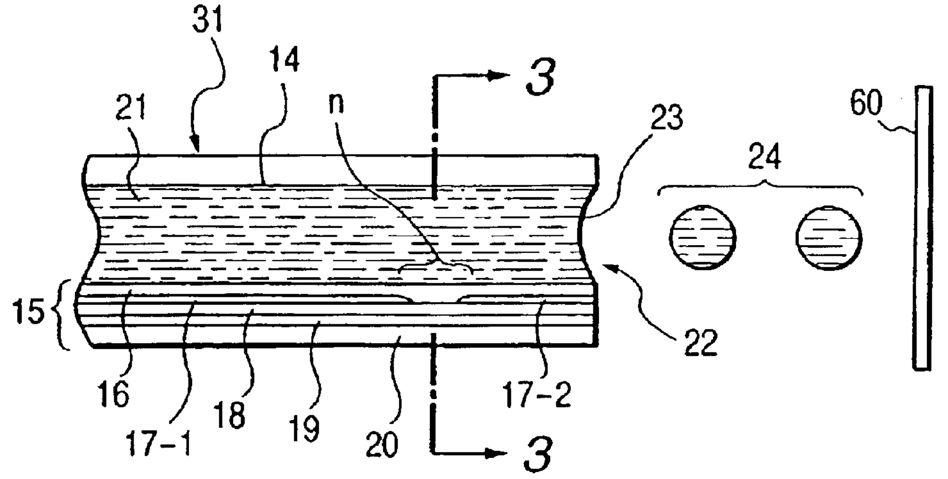
FIG. 2 is a sectional view showing one example of a nozzle in an ink-jet head used in the present invention.
Figure 3:
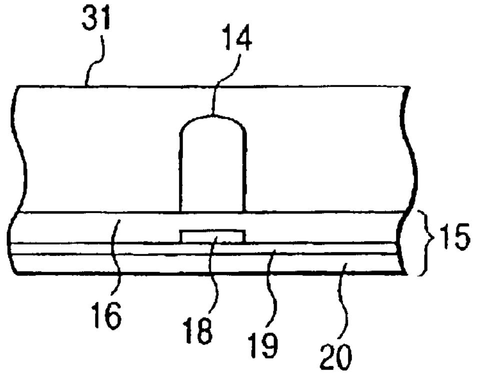
FIG. 3 is a sectional view of the nozzle taken along line 3—3 of FIG. 2.
Figure 4:
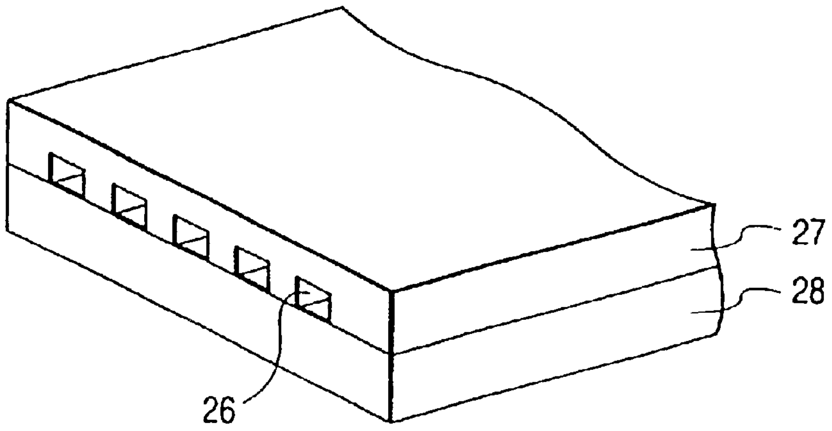
FIG. 4 is a perspective view showing one example of an ink head used in the present invention.

FIGS. 2 to 4 are schematic illustrations exemplifying an ink-jet head usable in the ink-jet recording section 1000. The ink-jet head 31 is obtained by bonding glass, ceramics, plastics or the like provided with a groove 14 for the passage of ink to a thermal head 15 used for thermal recording. The thermal head 15 comprises a protective layer 16 formed of silicone oxide or the like, aluminum electrodes 17-1 and 17-2, a heating resistor layer 18 formed of nichrome, a heat accumulating layer 19 and a highly radiative base plate 20 of aluminum or the like.

When an electric signal is applied to the electrodes 17-1 and 17-2, the region designated with n of the thermal head 15 is rapidly heated, bubbles are generated in ink 21 contacting therewith, and recording droplets 24 are ejected from orifices 22 toward a recording medium 60 by way of the pressure of the generated bubbles. FIG. 4 shows the outer appearance of a multi-head comprising an array of a plurality of heads shown in FIG. 2. This multi-head is prepared by bringing a glass plate 27 provided with a multi-groove 26 into contact with a thermal head 28 to bond together similar to that illustrated in FIG. 2. Incidentally, FIG. 2 is a sectional view of a head 31 taken along the ink flow route, while FIG. 3 is a sectional view taken along line 3—3 of FIG. 2.

Normally, the ink-jet recording section 1000 and the protective-layer forming section 2000 described above are different in mechanical movement. Namely, a recording medium 60 is intermittently fed in the ink-jet recording section 1000, while it is continuously fed in the protective-layer forming section 2000 normally. Accordingly, it is desirable to mechanically buffer a recording medium 60 conveyed between these sections, for example, by cutting or forming a loop.

Figure 5:
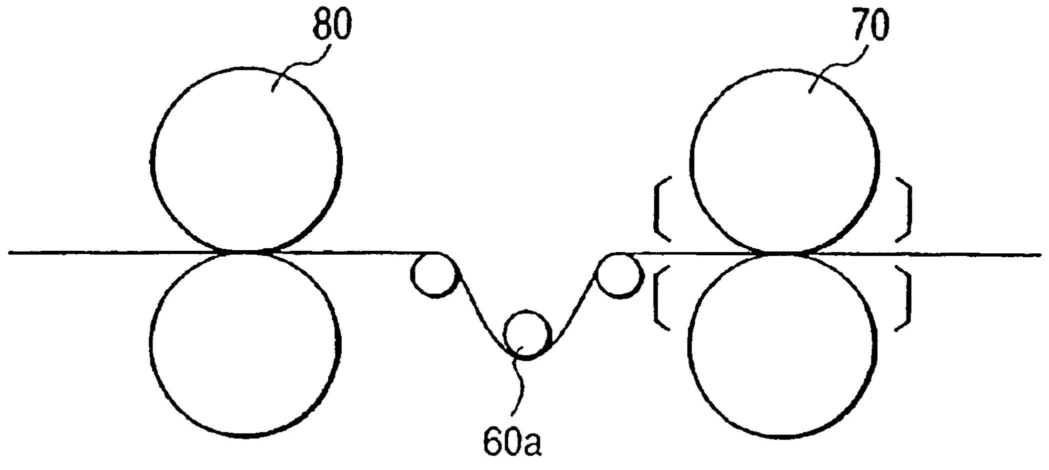
FIG. 5 is a view of one example of a loop of a recording medium between a preliminary heating section and a heating and pressurizing section.
Figure 6A:
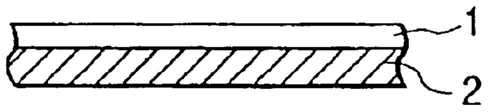
FIGS. 6A, 6B and 6C are illustrations of one example of a method for laminating a laminated film with a base material.
Figure 6B:
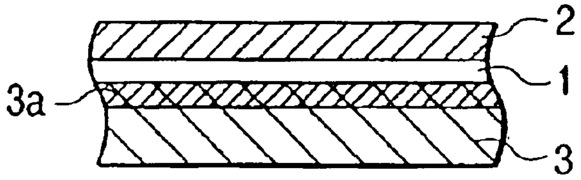
Figure 6C:
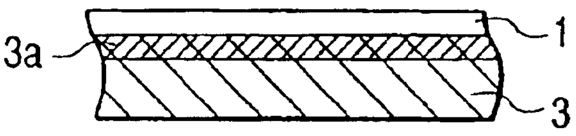

Besides, for the particle transfer part and the heating and pressurizing part of the protective-layer forming section 2000, it is also desirable to control the speed to be tuned or to buffer in a manner similar to the above. As one example of buffer, FIG. 5 schematically shows a situation of forming a loop 60*a* of a recording medium 60 between a preliminary heating section 70 and a heating and pressurizing section (fixing section) 80 to perform the above buffer.

The average particle diameter of thermoplastic resin particles is desirably smaller than the maximum uneveness of the surface of the image-receiving layer in a recording medium. If the average particle diameter is small like this, uneven portions of the surface of the image-receiving layer are easily filled with thermoplastic resin particles and a better protective layer can be formed. Specifically, the average diameter of thermoplastic resin particles is preferably in the range of 0.05 to 3 $\mu$m.

Thermoplastic resin particles used in the present invention, if capable of forming a protective layer on the image-receiving layer of a recorded recording medium, are not especially restricted otherwise. Thermoplastic resin particles having preferable characteristics such as transparency, close adherence, melting point, and anti-blocking may be appropriately selected for use. To be specific, thermoplastic resin particles obtained from polymerization or copolymerization of various monomers which include styrene monomers such as styrene, methylstyrene, ethylstyrene, butylstyrene, methoxystyrene, phenylstyrene and chlorostyrene; ethylene unsaturated mono-olefines such as ethylene, propylene and butylene; vinyl halgenides such as vinyl chloride and vinyl bromide; vinyl esters such as vinyl propionate; (meth)acrylate esters such as methyl (meth) acrylate, ethyl (meth)acrylate and propyl (meth)acrylate; vinyl ethers such as vinylmethyl ether; vinyl ketones such as vinylmethyl ketone; N-vinyl compounds such as N-vinyl indole; (meth)acrylonitriles; and monomers containing carboxyl group such as (meth)acrylate can be used. Furthermore, if desired, a charging controlling agent may be added.

Besides, it is preferable either that the glass transition point of thermoplastic resin particles is lower than that of a binder resin of an image-receiving layer in a recording medium or that the film-forming temperature of thermoplastic resin particles is lower than that of a binder resin of an image-receiving layer in a recording medium.

Besides, it is also preferable to use resin materials employed conventionally in multi-component toner such as binary component toner. Normally, improving the hardness of a protective layer and improving easiness of film-forming of a protective layer are mutually contradictory requirements. Thus, on using multi-component particles comprising two or more resin materials which function separately according to different physical properties, it becomes possible to satisfy mutually contradictory requirements. To be specific, among the thermoplastic resin particles mentioned above, those different in physical properties such as Tg and film-forming temperature should be selected and used.

In cases where two types of resin particles are used, for example, particles low in glass transition temperature, with their diameter made relatively small, intrude into the space between particles high in glass transition temperature, and thus these particles are easily settled. Specifically, it is effective to make the diameter of particles low in glass transition temperature smaller than the maximum uneveness of the surface of the image-receiving layer and make that of particles high in glass transition temperature greater than the maximum uneveness of the surface of the image-receiving layer. Besides, for the same reason, it is also effective to use particles obtained by kneading different types of resins with each other.

In any case, by optimizing a combination of thermal property of resin particles, their diameter, uneveness of the side of the image-receiving layer, further a manner of preliminary heating and so on, a highly functional glossy protective layer good in adhesion and high in surface hardness is implementable with a low temperature fixing process.

The image-receiving layer of a recording medium used in the present invention is preferably composed of porous inorganic particles and a binder resin, and the porous inorganic particles are preferably 30 to 1000 parts by weight, much preferably 50 to 500 parts by weight to 100 parts by weight of the binder resin.

As to porous inorganic particles, those containing many pores having 3 to 30 nm diameter in their structure are desirable, and above all, those having large pore density near the surface of particles are preferable. From the viewpoint of obtaining a sufficient ink absorbing rate, the specific surface area is preferably equal to or larger than 50 $m^2/g$. Furthermore, in the case of using a high-speed printing ink-jet printer, the image-receiving layer preferably contains 50% by weight or more of porous inorganic particles with the specific surface area of 100 $m^2/g$ or more, from the viewpoint of preventing the overflow of ink.

Such porous inorganic particles having the ink solvent absorptivity and dye-molecule adsorptivity preferably have white color. Materials constituting porous inorganic particles and having these characteristics include metals such as aluminum, magnesium and silicon or semimetal oxides, hydrates, carbonates and so on. Among all of them, synthetic silica is especially preferable because of excellence in the above characteristics, established industrial production process, inexpensiveness and stablility.

In an image-receiving layer comprising a mixture of such inorganic particles and an organic binder resin, it is desirable from the viewpoint of ink absorptivity not to make the diameter of inorganic particles too small. In many cases, inorganic particles in the range of 0.1 to 10 $\mu$m in diameter are used and not sufficiently small to the wavelength of light, so that light scattering on the surface occurs and a matted appearance is observed. Of these, for ultrafine particles in the range of 0.1 to 1 $\mu$m in diameter, a considerably reduced glossy surface in matte may be obtained, but normally a secondary aggregation of particles takes place so that the surface cannot be made so smooth. Besides, when a dispersant or the like is added to the coating liquid to prevent this aggregation, the absorptivity of ink or the stability of dye-molecules are often damaged.

For these reasons, a recording medium containing porous inorganic particles in pursuit of high-speed absortivity of ink and coloring stability of a dye normally results in a matted surface. The present invention displays considerable meritorious effects in use for a recording medium provided with such an image-receiving layer.

Hereinafter, examples of the present invention will be described.

EXAMPLE 1

Two parts of binder resin emulsion (Takamatsu Yushi; NS120-XK) was added to 1 part of silica (Mizusawa Chemical Industries; Mizukasil P-50), thereafter the mixture was dispersed to prepare a coating liquid so that the solid content becomes 20% by weight. This coating liquid was coated and dried onto fine paper of 186 $g/m^2$ as base material by means of a slot-dye coator so that a film after the drying became 30 $\mu$m thick to form an image-receiving layer.

Thermoplastic resin particles of vinyl chloride-vinyl acetate copolymer, with an average diameter of 0.5 $\mu$m were used to carry out the ink-jet recording and the formation of a protective layer by means of the apparatus shown in FIG. 1. The temperature of the heating and pressurizing roller 107 during the fixation was set to 140° C., the surface roughness Ra of the heating and pressurizing roller 107 on the side of the protective laser was set to 0.7 $\mu$m and silicone rubber was employed as releasable material for the surface. As a result, recorded images having an excellent glossiness were obtained.

EXAMPLE 2

Except that binary component particles comprising thermoplastic resin particles of acrylic polymer with an average diameter of 1.5 $\mu$m and thermoplastic resin particles of vinyl chloride-vinyl acetate copolymer with an average diameter of 0.3 $\mu$m were used and that the temperature of the heating and pressurizing roller 107 was set to 120° C., ink-jet recording and formation of a protective layer were carried out as with Example 1, then similar good results were obtained.

As described above, according to the present invention, thermoplastic resin particles are stuck to the surface of a recorded image-receiving layer without use of a base material, a protective layer is formed by heating and pressurizing this and the surface of the protective layer is smoothed, so that glossy good recorded images can be formed at a low cost and without used wastes. Moreover, since no use of a base material allows the heat from heating means to be directly transmitted to thermoplastic resin particles themselves, the thermal load of an apparatus or the like is low.

What is claimed is:

1. A process for forming images comprising:

(i) a conducting step of conducting recording on a recording medium provided with an image-receiving layer;

(ii) a providing step of providing thermoplastic resin particles, without using a base material, onto the image-receiving layer on which recording has been conducted in step (i); and (iii) a heating and pressurizing step of heating and pressurizing the thermoplastic resin particles on the image-receiving layer to form a protective layer.

2. A process according to claim 1, wherein the average diameter of the thermoplastic resin particles is in the range of 0.05 to 3 $\mu$m.

3. A process according to claim 1, wherein either the glass transition point of the thermoplastic resin particles is lower than the glass transition point of a binder resin in the image-receiving layer, or the film-forming temperature of the thermoplastic resin particles is lower than the film-forming temperature of a binder resin in the image-receiving layer.

4. A process according to claim 1, wherein the average particle diameter of the thermoplastic resin particles is smaller than the maximum unevenness of the surface of the image-receiving layer.

5. A process according to claim 1, wherein the thermoplastic resin particles comprise two or more types of resin particles.

6. A process according to claim 1, wherein said providing step comprises a sub-step of using an intermediate transfer body to provide the thermoplastic resin particles to the image-receiving layer.

7. A process according to claim 6, wherein a charged drum is used as the intermediate transfer body.

* * * * *

UNITED STATES PATENT AND TRADEMARK OFFICE

CERTIFICATE OF CORRECTION

PATENT NO. : 6,859,220 B1
DATED : February 22, 2005
INVENTOR(S) : Kenji Suzuki et al.

It is certified that error appears in the above-identified patent and that said Letters Patent is hereby corrected as shown below:

Column 2,
Lines 14 and 22, "basic" should read -- base material --.

Column 5,
Lines 56 and 59, "is" should read -- be --.

Column 7,
Line 17, "coator" should read -- coater --.

Signed and Sealed this

Sixteenth Day of August, 2005

Jon W. Dudas

JON W. DUDAS
*Director of the United States Patent and Trademark Office*